(12) United States Patent
King

(10) Patent No.: US 7,562,348 B1
(45) Date of Patent: *Jul. 14, 2009

(54) METHOD AND SYSTEM FOR OBTAINING DEVICE SERVICES ON A SELF-SERVICE FINANCIAL TRANSACTION TERMINAL

(75) Inventor: Michael Jay King, West Los Angeles, CA (US)

(73) Assignee: Citicorp Development Center, Inc., Cincinnati, OH (US)

( * ) Notice: Subject to any disclaimer, the term of this patent is extended or adjusted under 35 U.S.C. 154(b) by 2289 days.

This patent is subject to a terminal disclaimer.

(21) Appl. No.: 09/703,160

(22) Filed: Oct. 31, 2000

Related U.S. Application Data

(60) Provisional application No. 60/162,994, filed on Nov. 1, 1999.

(51) Int. Cl.
*G06F 9/44* (2006.01)
*G06Q 40/00* (2006.01)
*H04K 1/00* (2006.01)

(52) U.S. Cl. ............... 717/121; 717/177; 717/178; 705/35; 705/69; 705/73

(58) Field of Classification Search ................. None
See application file for complete search history.

(56) References Cited

U.S. PATENT DOCUMENTS

| | | | |
|---|---|---|---|
| 4,636,947 A | 1/1987 | Ward | 364/200 |
| 5,617,528 A | 4/1997 | Stechmann et al. | 395/326 |
| 5,691,897 A | 11/1997 | Brown et al. | 364/167.01 |
| 5,764,985 A | 6/1998 | Smale | 395/682 |
| 7,051,096 B1 * | 5/2006 | Krawiec et al. | 709/223 |

OTHER PUBLICATIONS

"NatWest Introduces First WOSA-Friendly ATMs," *Electronic Payments International*, N. 120, p. 4, Jun. 1997.
"NatWest Bank Installs WOSA On Cash Machine Network," *Newbytes News Network*, May 13, 1997.
"Siemens Nixdorf Introduces ProCash—The New ATM System Family for the 21st Century," *Business Wire*, p. 1303, Dec. 7, 1999.
"Siemens Nixdorf ATMs First to be Certified by Citigroup," *Business Wire*, p. 1301, Dec. 7, 1999.

(Continued)

*Primary Examiner*—Chuck O Kendall
(74) *Attorney, Agent, or Firm*—George T. Marcou; King & Spalding LLP

(57) ABSTRACT

A method and system for obtaining ATM device services utilizes a service provider framework in which data is received by an ATM application that indicates there is a need for the performance of an ATM device function. The ATM application issues a request to an XFS manager to get the ATM device service by making a sub-routine call to the XFS manager to get the ATM device service from a service provider. The XFS manager translates the sub-routine call as an entry point into the service provider for processing by the service provider, and a request object associated with the request is instantiated. The service provider is implemented by instantiating an instance of the service provider framework XFS service provider base class and one or more instances of the service provider framework request objects required to process the request. After processing the request, the service provider returns a result to the ATM application.

71 Claims, 11 Drawing Sheets

OTHER PUBLICATIONS

"NatWest Deploys World's First WOSA/XFS v. 2.0 Solution for Self-Service on NCR ATMs," *PR Newswire*, p. 1203, Dec. 3, 1997.

"Nexus to Support Peripherals for Fiserv Windows-Based Branch Automation Software," *Business Wire*, p. 7280009, Jul. 28, 1995.

* cited by examiner

| WFPCancelAsyncRequest Parameters | Variable Name of Access Function |
|---|---|
| hService | HSERVICE getServiceHandle( ) |
| reqID | REQUESTID getRequestID( ) |

Fig. 4

| WFPClose Parameters | Variable Name of Access Function |
|---|---|
| hService | HSERVICE getServiceHandle( ) |
| hWnd | HWND getRequestCompleteWindow( ) |
| reqID | REQUESTID getRequestID( ) |

Fig. 5

| WFPDeregister Parameters | Variable Name of Access Function |
|---|---|
| hService | HSERVICE getServiceHandle( ) |
| dwEventClass | DWORD eventClass |
| hWndReg | HWND eventWnd |
| hWnd | HWND getRequestCompleteWindow( ) |
| reqID | REQUESTID getRequestID( ) |

Fig. 6

| WFPExecute Parameters | Variable Name of Access Function |
|---|---|
| hService | HSERVICE getServiceHandle( ) |
| dwCommand | DWORD CommandID |
| lpCommandData | LPVOID CommandData |
| dwTimeOut | DWORD getRequestTimeout( ) |
| hWnd | HWND getRequestCompleteWindow( ) |
| reqID | REQUESTID getRequestId( ) |

Fig. 7

| WFPExecute Parameters | Variable Name of Access Function |
|---|---|
| hService | HSERVICE getServiceHandle( ) |
| dwCategory | DWORD infoCategory |
| lpQueryDetails | LPVOID queryDetails |
| dwTimeOut | DWORD getRequestTimeout( ) |
| hWnd | HWND getRequestCompleteWindow( ) |
| reqID | REQUESTID getRequestID( ) |

Fig. 8

| WFPOpen Parameters | Variable Name of Access Function |
|---|---|
| hService | HSERVICE getServiceHandle( ) |
| lpszLogicalName | LPSTR logicalName |
| hApp | HAPP applicationHandle |
| lpszApplicationID | LPSTR applicationId |
| dwTraceLevel | DWORD tracelevel |
| dwTimeOut | DWORD getRequestTimeout( ) |
| hWnd | HWND getRequestCompleteWindow( ) |
| reqID | REQUESTID getRequestID( ) |
| hProvider | HPROVIDER providerHandle |
| dwSPVersionsRequired | DWORD spiVersionsRequired |
| lpSPIVersion | LPWFSVERSION spiVersionInfo |
| dwSrvcVersionsRequired | DWORD srvcVersionsRequired |
| lpSrvcVersion | LPWFSVERSION srvcVersionInfo |

Fig. 9

| WFPResister Parameters | Variable Name of Access Function |
|---|---|
| hService | HSERVICE getServiceHandle( ) |
| dwEventClass | DWORD eventClasss |
| hWndReg | HWND eventWnd |
| hWnd | HWND getRequestCompleteWindow() |
| reqID | REQUESTID getRequestId( ) |

Fig. 10

| WFPSetTraceLevel Paramenters | Variable Name of Access Function |
|---|---|
| hService | HSERVICE getServiceHandle( ) |
| dwTraceLevel | DWORD tracelevel |

Fig. 11

METHOD AND SYSTEM FOR OBTAINING DEVICE SERVICES ON A SELF-SERVICE FINANCIAL TRANSACTION TERMINAL

PRIORITY APPLICATION

This application claims priority to co-pending U.S. Provisional Application No. 60/162,994, dated Nov. 1, 1999, entitled "Method And System For Extensions For Financial Services Service Provider Framework For A Self-Service Transaction Terminal (XFS Service Provider Framework)," and is incorporated herein by reference.

CROSS REFERENCE TO RELATED APPLICATIONS

This application relates to EP 109644 A2, filed simultaneously, entitled "Method And System For Secure Communication Between A Self-Service Financial Transaction Terminal And A Remote Operator Interface," and is incorporated herein by reference.

This application relates to Ser. No. 60/163,002, filed simultaneously, entitled "Method And System For Installing And/Or Upgrading Software On A Self-Service Financial Transaction Terminal From A Remote Computer," and is incorporated herein by reference.

This application relates to EP 1096374 A2, filed simultaneously, entitled "Method And System For Simultaneous And Unattended Installation Of Software On A Self-Service Financial Transaction Terminal," and is incorporated herein by reference.

This application relates to US 6968321 B1, filed simultaneously, entitled "Method And System For Remote Operator Interface With A Self-Service Financial Transaction Terminal," and is incorporated herein by reference.

This application relates to Ser. No. 09/702,391, filed simultaneously, entitled "Method And System For Coordinating Session Activities At A Self-Service Financial Transaction Terminal," and is incorporated herein by reference.

This application relates to EP 1096444 A2, filed simultaneously, entitled "Method And System For Configuration Of Self-Service Financial Transaction Terminals For A Common Software Release," and is incorporated herein by reference.

This application relates to U.S. Provisional Application No. 60/162,673, filed Nov. 1, 1999, entitled "Method And System For Secure Communication Between A Self-Service Transaction Terminal And A Remote Operator Interface (Remote Operator Interface Security)," and is incorporated herein by reference.

This application relates to U.S. Provisional Application No. 60/163,002, filed Nov. 1, 1999, entitled "Method And System For Installing And/Or Upgrading Software On A Self-Service Financial Transaction Terminal From A Remote Computer (Remote Installation/Software Upgrade)," and is incorporated herein by reference.

This application relates to U.S. Provisional Application No. 60/162,815, filed Nov. 1, 1999, entitled "Method And System For Simultaneous And Unattended Installation Of Software On A Self-Service Financial Transaction Terminal (Global Installation Framework)," and is incorporated herein by reference.

This application relates to U.S. Provisional Application No. 60/163,000, filed Nov. 1, 1999, entitled "Method And System Of Remote Operator Interface For A Self-Service Financial Terminal (Remote Operator Interface)", and is incorporated herein by reference.

This application relates to U.S. Provisional Application No. 60/162,816 filed Nov. 1, 1999, entitled "Method And System For Coordinating Session Activities At A Self-Service Financial Transaction Terminal (ATM Session Manager)," and is incorporated herein by reference.

This application relates to U.S. Provisional Application No. 60/162,672, filed Nov. 1, 1999, entitled "Method And System For Configuration Of Self-Service Financial Terminals For A Common Software Release (Framework For Configuration Of Self-Service Financial Terminals)," and is incorporated herein by reference.

COPYRIGHT NOTIFICATION

A portion of the disclosure of this patent document and its figures contain material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

This invention relates generally to the field of self-service financial transaction terminals, such as automatic teller machines (ATMs), and more particularly to a method and system for obtaining ATM device services using a service provider framework.

2. Background

Typically, a financial institution, such as a bank, develops its own proprietary ATM hardware and software, in addition to ATM hardware and software which it may purchase from a variety of ATM vendors. Implementation of systems from other makers can be difficult because, for example, of difficulty in interfacing and reusing present application resources. ATMs contain special devices, such as cash dispensers, card readers, and printers, which require a specialized interface for control from applications. Previously, hardware makers' interfaces were proprietary, and the Windows Open Services Architecture Extensions for Financial Services (WOSA/XFS) was developed to define a standard for application control of specialized ATM peripherals.

The term WOSA/XFS defines a standard for an interface with which applications, such as ATM applications, can get device services, such as making the cash dispenser dispense cash or reading a customer's transaction card. Using the WOSA/XFS standard, applications and back-end services are connected through the unified set of an Application Programming Interface (API) and a Service Provider Interface (SPI) in a Windows environment. Thus, applications only have to be conscious of the WOSA interface and not of the implementation of various services. Development by a financial institution of its own WOSA/XFS-compliant software can assure the portability of the financial institution's software to ATMs provided by a variety of vendors.

SUMMARY OF THE INVENTION

It is a feature and advantage of the present invention to provide a method and system for obtaining ATM device services that enables a financial institution to have its applications require device services on a variety of vendors' ATM machines, as well as its own ATM machines.

It is another feature and advantage of the present invention to provide a method and system for obtaining ATM device services that allows the financial institution's service provider developers to be concerned only with the code specific and the device specific code for a particular device.

It is an additional feature and advantage of the present invention to provide a method and system for obtaining ATM device services that enables a financial institution to develop service providers in-house in a timely fashion with the financial institution's source code and within the proper control of the financial institution.

To achieve the stated and other features, advantages and objects, an embodiment of the present invention makes use of XFS-compliant service providers to enable a financial institution, such as a bank, in the implementation of its ATM system, to have its applications require device services on a variety of vendors' ATM machines, as well as its own ATM machines, such that getting device services on a particular vendor's platform is the same as getting device services on its own platform. The method and system for an embodiment of the present invention provides all the common processing that, in the development of a service provider, is common to every service provider and allows the service provider developer to be concerned only with the code-specific and the device-specific code for a particular device. Thus, development of service providers can be provided in-house in a timely fashion with the financial institution's source code and within the proper control of the financial institution.

An embodiment of the present invention makes use of a service provider framework in which data is received by the ATM application, such as a customer making a selection on the ATM touchscreen, that indicates to the ATM application that there is a need for the performance of an ATM device function, such as a depository function, a printer function, a card reader function, a safe door function, a cash dispenser function, or a touchscreen function. The ATM application makes a sub-routine call, referred to as a WFS request, to a lower level layer of central ATM monitoring and management application software to request device service from a service provider. The sub-routine call is translated at the lower level layer into a function category request, referred to as a WFP request, by an XFS manager as an entry point into the service provider for processing by the service provider. The selection of function category requests include, for example, a WFPCancelAsyncRequest request, a WFPClose request, a WFPDeregister request, a WFPExecute request, a WFPGetInfo request, a WPFLock request, a WFPOpen request, a WFPRegister request, a WFPSetTraceLevel request, a WFPUnloadService request, and a WFPUnlock request. After processing the request, the service provider returns a result to the ATM application.

In an embodiment of the present invention, the ATM application receives the data indicative of a need for obtaining an ATM device service in connection with an ATM device, such as a depository, a printer, a card reader, a safe door, a cash dispenser, and/or a touchscreen. The ATM application issues a request to the XFS manager to get the ATM device service by making a sub-routine call to the XFS manager to get the ATM device service from a service provider. The XFS manager translates the sub-routine call as an entry point into the service provider for processing by the service provider, and a request object associated with the request is instantiated. The service provider is implemented by instantiating an instance of the service provider framework XFS service provider base class and one or more instances of the service provider framework request objects required to process the request.

The service provider for an embodiment of the present invention instantiates a specific instance of the service provider's service provider request object which is derived from the XFS service provider base class service provider request object class hierarchy. The basic unit in which service provider processing is performed is the request object, and there is a request object defined for eleven WFP requests, comprising a SpiRequest class, a SpiAsyncRequest class, a request specific class, such as OpenRequest or Execute Request, and optionally, a service provider specific request class, one of which is derived from the other. As WFP requests are made, the service provider framework invokes virtual methods within derived objects of the service provider through class inheritance to allow the service provider to perform processing unique to the particular ATM device service.

The WFP requests for an embodiment of the present invention are processed in two parts, the first part being called the immediate processing part and the second part being called the deferred processing part. Immediate processing is performed in the same thread as used by the XFS manager when invoking an entry point of the service provider. The service provider framework performs parameter verification in its immediate processing method. If no errors are encountered, the service provider framework invokes the spImmediateProcessing( ) method within the service provider's derived class. At this point, the service provider can perform more specific, although not complete, parameter verification. The return code from the spImmediateProcessing( ) method is returned to the XFS manager. If the service provider has not implemented a spImmediateProcessing method, the service provider framework determines which code is returned to the XFS manager.

If the service provider for an embodiment of the present invention has not implemented the spDeferredProcessing( ) method, the service provider framework posts the request complete event. Exceptions to this include the WFPCancelAsyncRequest, WFPSetTraceLevel, and WFPUnload requests, which are process immediate request and have no deferred processing methods. The process immediate requests are handled completely by the service provider framework and require no processing on the part of the service provider. The service provider framework uses, for example, four threads per service provider to manage WFP requests for a particular service provider, including a deferred processing queue manager thread and a deferred processing thread. WFP requests are placed on a deferred processing queue, and when signaled, the deferred processing queue manager thread pops a request object from the deferred processing queue and creates a deferred processing thread in which the deferred processing for the particular WFP request is performed.

In an embodiment of the present invention, when a WFP request is dequeued, a processing thread is created and the service provider framework performs the deferred processing for the particular request that is common to all service providers. Upon successful completion of that processing, the service provider framework invokes a spDeferredProcessing( ) method within a derived class of the service provider, and the service provider performs all processing necessary to satisfy the request within the spDeferredProcessing method, including posting a request complete event. When the deferred processing method returns, the thread is terminated, and the request object is deleted. If the service provider has not implemented the spDeferredProcessin( ) method, the service provider framework posts a request complete.

In an embodiment of the present invention, the service provider accesses one or more request parameters for one or more WPF requests. WPF requests include, for example, a WFPCancelAsyncRequest request, a WFPClose request, a WFPDeregister request, a WFPExecute request, a WFPGet- Info request, a WPFLock request, a WFPOpen request, a WFPRegister request, a WFPSetTraceLevel request, a WFPUnloadService request, and a WFPUnlock request. The request parameters for the WFPCancelAsyncRequest request include an hService parameter and a reqID parameter; the request parameters for the WFPClose request include an hService parameter, an hWnd parameter, and a reqID parameter; the request parameters for the WFPDeregister request include an hService parameter, a dwEventClass parameter, an hWndReg parameter, an hWnd parameter, and a reqID parameter; and the request parameters for the WFPExecute request include an hService parameter, a dwCommandData parameter, an IpCommandData parameter, a dwTimeOut parameter, an hWnd parameter, and a reqID parameter.

In addition, the request parameters for the WFPGetInfo request include an hService parameter, a dwCagegory parameter, an IPQueryDetails parameter, a dwTimeOut parameter, an hWnd parameter, and a reqID parameter; the request parameters for the WFPOpen request include an hService parameter, an IpszLogicalName parameter, an hApp parameter, an IpszApplicationID parameter, a dwTraceLevel parameter, a dwTimeOut parameter, an hWnd parameter, a reqID parameter, an hPprovider parameter, a dwSPVersionsRequired parameter, an IpSPIVersion parameter, a dwSrvcVersionsRequired parameter, and an IpSrvcVersion parameter; the request parameters for the WFPRegister request include an hService parameter, a dwEventClass parameter, an hWndReg parameter, an hWnd parameter, and a reqID parameter; and the request parameters for the WFPSetTraceLevel request include an hService parameter and a dwTraceLevel parameter.

Additional objects, advantages, and novel features of the invention will be set forth in part in the description which follows, and in part will become more apparent to those skilled in the art upon examination of the following, or may be learned by practice of the invention.

BRIEF DESCRIPTION OF THE FIGURES

FIG. 4 is a table that shows examples of WFPCancelAsyncRequest parameters and how each accessed for an embodiment of the present invention;

FIG. 5 is a table that shows examples of WFPClose parameters and how each is accessed for an embodiment of the present invention.

FIG. 6 is a table which illustrates examples of WFPDeregister parameters and how each is accessed for an embodiment of the present invention;

FIG. 7 is a table which illustrates examples of WFPExecute parameters and how each is accessed for an embodiment of the present invention;

FIG. 8 is a table that shows examples of WFPGetInfo parameters and how each is accessed for an embodiment of the present invention;

FIG. 9 is a table which illustrates examples of WFPOpen parameters and how each is accessed for an embodiment of the present invention;

FIG. 10 is a table which illustrates examples of WFPRegister parameters and how each is accessed for an embodiment of the present invention; and FIG. 11 is a table which illustrates examples of WFPSetTraceLevel parameters and how each is accessed for an embodiment of the present invention.

DETAILED DESCRIPTION

Referring now in detail to an embodiment of the present invention, an example of which is illustrated in the accompanying attachment, the method and system for an embodiment of the present invention makes use of XFS-compliant service providers to enable a financial institution, such as a bank, in implementation of its ATM system, sometimes referred to herein as global ATM, to have its applications require device services on a variety of vendors' ATMs, as well as its own ATMs. In that way, getting device services on a particular vendor's platform is the same as getting device services on the financial institution's own platform. The XFS service provider framework for an embodiment of the present invention provides all the common processing that, in the development of a service provider, is common to every service provider. There is one service provider per device, and an embodiment of the present invention provides the common processing that each service provider is required to perform. This allows the service provider developer to be concerned only about the code-specific and the device-specific code for a particular device.

The software for an embodiment of the present invention is meant to run on the financial institution's ATMs. The other vendors provide their own service providers for their own devices. It is at the device level that the differences appear, which become quite pronounced between different ATM vendors. Typically, applications which are visible to the customer can run readily from one vendor to another. However, getting device services is typically quite different from one vendor to the other. The service providers provide a layer to make that invisible from the applications. In an embodiment of the present invention, the XFS interface is presented to the applications, and the applications are not concerned with what goes on below that. An aspect of embodiment of the present invention includes development of these service providers. The framework for an embodiment of the present invention makes use of a number of files, referred to as "H" files and a Dynamic Link Library (DLL) from which is compiled and to which is linked in order to develop what is called a service provider. The method and system of the present invention is used only in conjunction with the applications which make device requests for device services. Terms, such as "queuing" and "WFS request," as used herein are defined in the XFS standard, with which the framework for an embodiment of the present invention is compliant. For example, the term "WFS" is a prefix indicating a particular function category.

Figure 1:
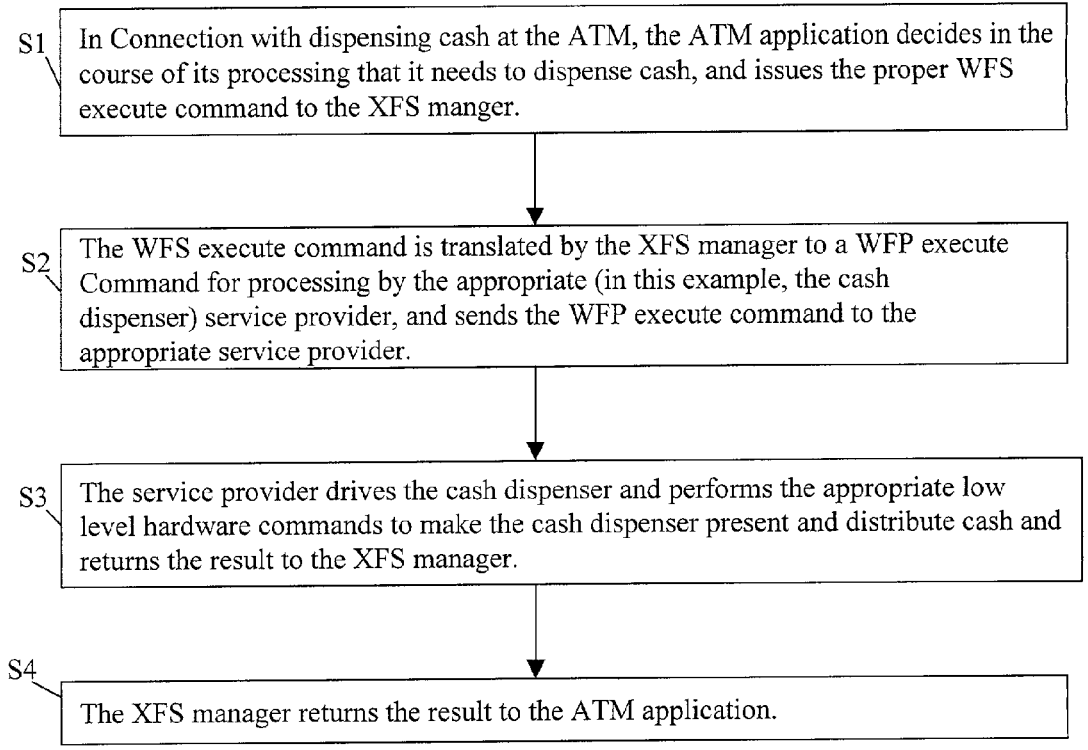
FIG. 1 is a flow chart which illustrates an example of the process of requesting device services, such as dispensing cash, for an embodiment of the present invention.

FIG. 1 is a flow chart which illustrates an example of the process of requesting device services, such as dispensing cash, for an embodiment of the present invention. Referring to FIG. 1, at S1, in connection with dispensing cash at the ATM, the application, which is a thing the customer sees, decides in the course of its processing that it needs to dispense cash. There is an XFS standard defined for dispensing cash, and the application knows that at that point it can issue the proper command, which is called a WFS execute command. At S2, the WFS execute command is translated by the XFS manager to a WFP execute command for processing by the appropriate (in this case cash dispenser) service provider. The term "WFP" is another prefix indicating a particular function category, and the WFP execute command goes to the appropriate service provider. At S3, the service provider drives the cash dispenser and performs the appropriate low level hardware commands to make the cash dispenser present and distribute cash. The service provider returns the result to the XFS manager, and at S4, the XFS manager returns the result back to the application. A difference between WFS commands and WFP commands, for example, is that WFS commands are made by ATM applications to get device services from service providers, and WFP commands are the function entry points "into" the service provider that the framework for an embodiment of the present invention "exposes" to the XFS manager. The XFS manager translates WFS commands into the corresponding WFP command.

The method and system for an embodiment of the present invention is used in customer sessions other than dispensing cash. Other functions include, but are not limited to, for example, depositing, printing, managing the ATM card reader, as well as the function of managing and keeping track of when the safe door opens or closes and taking the ATM out of service when that occurs. There are basically five devices that are involved directly with customer sessions, such as dispensing cash, depositing an envelope, printing a receipt or ticket, driving the touchscreen, and also the card reader. In the method and system for an embodiment of the present invention, there is a button on the ATM touchscreen, and if the button pressed, a certain amount of cash is be dispensed to the customer. When the customer touches the touchscreen it appears, for example, as a mouse event to the ATM application. In other words, it is like someone clicking with a mouse. When an application gets notification that the button has been touched, it makes an Object Linking and Embedding (OLE) call, which is basically a sub-routine call, to a lower level item of software, and that sub-routine call is then translated at the lower layer of software into a WFP execute command. That is the entry point into the framework for an embodiment of the present invention. At that point, the framework passes an entry point that is below the framework into the specific service provider, and the service provider then has control and can issue the proper device commands to get the cash.

An embodiment of the present invention provides a solution for a financial institution because, for example, it can be provided in-house in a timely fashion with the financial institution's source code and within the proper control of the financial institution. Turning now to a description of the class structure and basic processing of the XFS service provider framework for an embodiment of the present invention, the framework provides the service provider developer with a set of C++ (object-oriented programming language) objects that perform the necessary processing to be an XFS compliant service provider. The developer then needs only to provide that code unique to the specific service provider.

Figure 2:
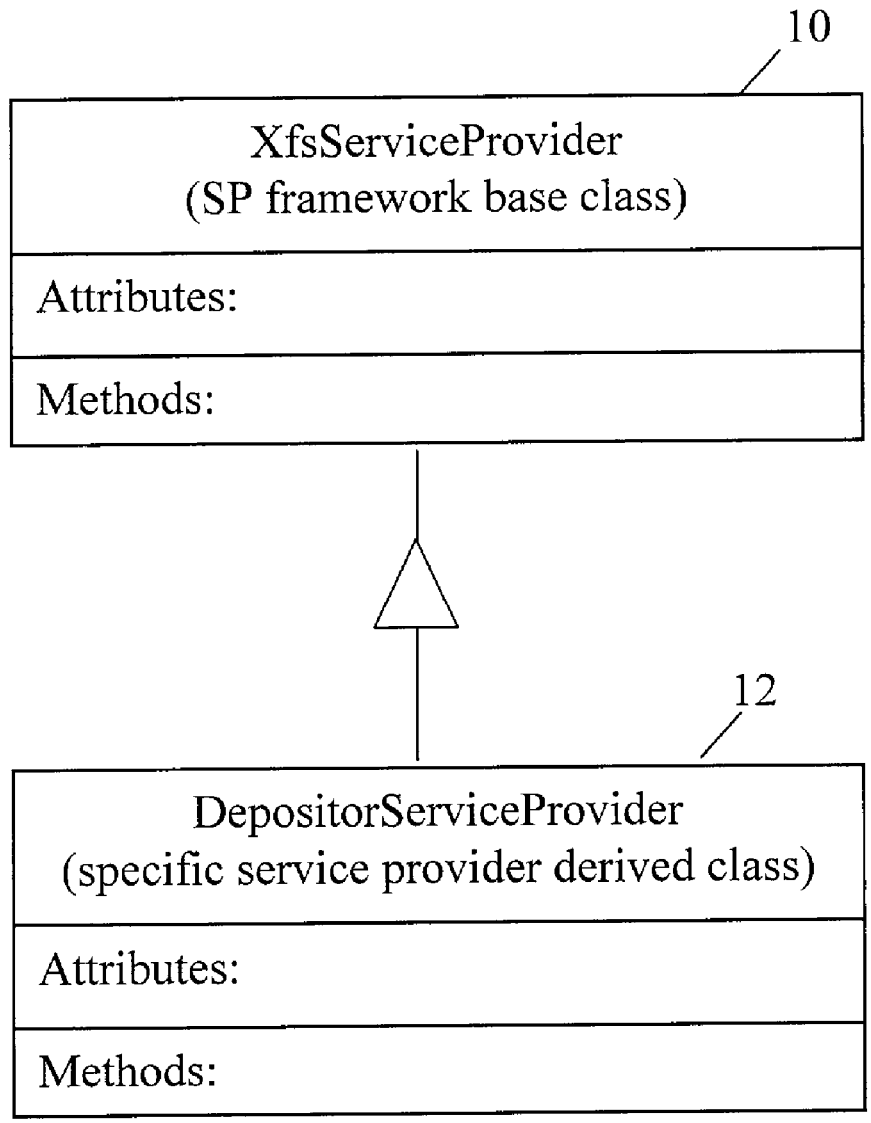
FIG. 2 is a diagram which illustrates an example of XFS service provider hierarchy, using a depositor example, for an embodiment of the present invention.

In an embodiment of the present invention, a service provider is implemented by instantiating an instance of the service provider framework XFS service provider base class and instances of the framework request objects. As WFP requests are made, the service provider framework through C++ class inheritance, invokes virtual methods within the service provider's derived request objects to allow the service provider to perform processing unique to that service. FIG. 2 is a diagram which illustrates an example of XFS service provider hierarchy, using a depositor example, for an embodiment of the present invention. The XFS service provider base class 10 contains the service provider framework objects required to process WFP requests. Each service provider is required to instantiate a specific instance 12 of it's service provider object. That instance 12 must be derived from the XFS service provider base class 10 as shown in FIG. 2.

Figure 3:
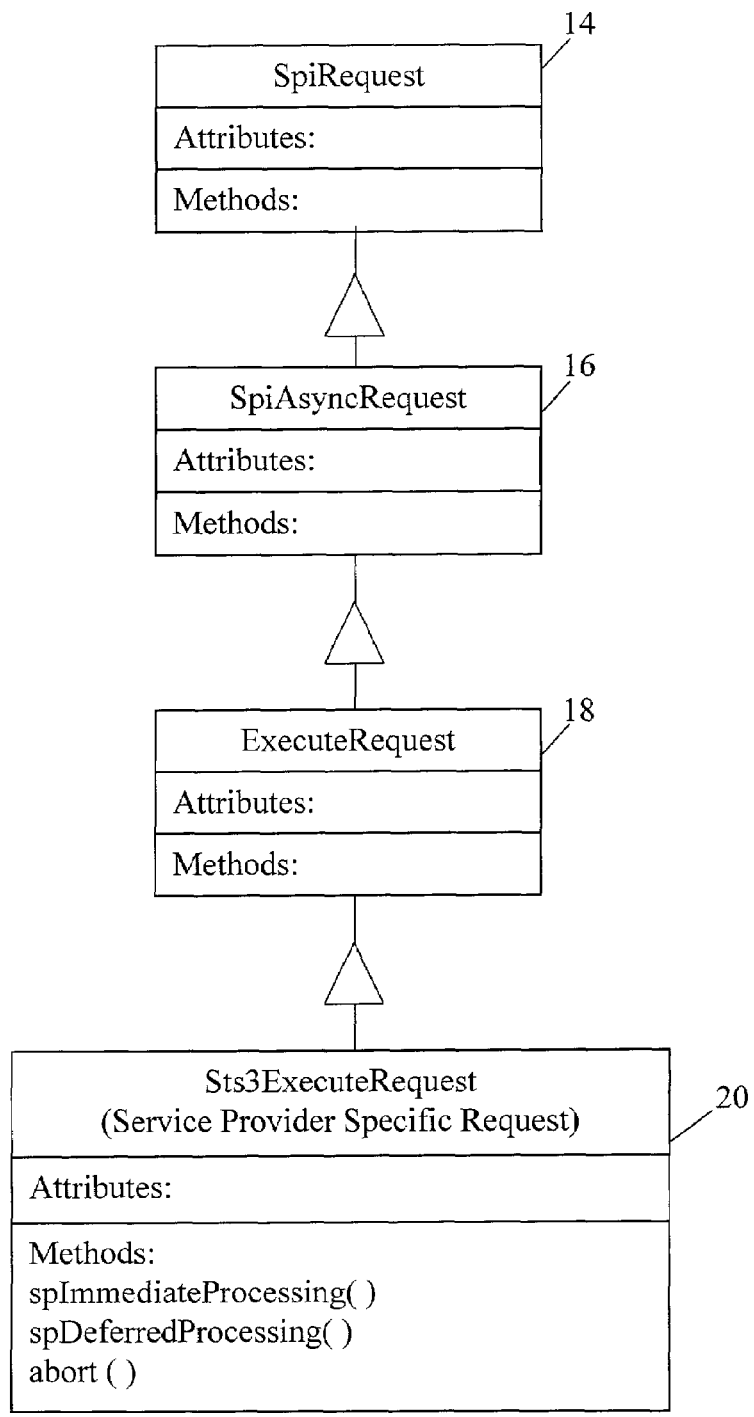
FIG. 3 is a diagram which illustrates an example of service provider request object class hierarchy, using a WFPExecute request example, for an embodiment of the present invention.

FIG. 3 is a diagram which illustrates an example of service provider request object class hierarchy, using a WFPExecute request example, for an embodiment of the present invention. The basic unit in which all service provider processing is performed, is the request object. There is a request object defined, for example, for eleven WFP requests. The request object comprises a SpiRequest class 14, a SpiAsyncRequest class 16, a request specific class, such as OpenRequest or ExecuteRequest 18, and optionally, a service provider specific request class 20. One is derived from the other as shown in FIG. 3, which uses the WFPExecute request as an example.

In an embodiment of the present invention, each time the XFS manager invokes one of a service provider's WFP entry points, a request object associated with that request is instantiated. WFP requests are processed in two parts. The first part is referred to as "immediate processing", and the second part is referred to as "deferred processing". Immediate processing is performed in the same Windows thread as that used by the XFS manager when invoking a service provider's WFP entry point. The service provider framework performs parameter verification in its immediate processing method. If no errors are encountered, the service provider framework invokes the spImmediateProcessing( ) method within the service provider's derived class. At this point, the service provider can perform more specific, although not complete, parameter verification. The return code from spImmediateProcessing( ) is returned to the XFS manager. If the service provider has not implemented a spImmediateProcessing method, the service provider framework determines which code is returned to the XFS manager.

Once the immediate processing has completed without errors, in an embodiment of the present invention, a request timer for that request is enabled and the request object is placed on the deferred processing queue. This ensures proper serialization of request processing as required by the WOSA standard. When dequeued, a processing thread is created and the service provider framework performs the deferred processing for that request that is common to all service providers. If that completes successfully, the service provider framework invokes the spDeferredProcessing( ) method within the service provider's derived class. Within this method, the service provider performs all the processing necessary to satisfy the request including posting the request complete event. When the deferred processing method returns, the thread is terminated and the request object is then deleted. If the service provider has not implemented the spDeferredProcessing( ) method, the service provider framework posts the request complete event.

An exception to the foregoing are the WFPCancelAsyncRequest, WFPSetTraceLevel, and the WFPUnload requests. These are "process immediate" requests, and as such, they have no deferred processing methods. All of these requests are completely handled by the service provider framework and require no processing on the part of the service provider.

A WFP request can be interrupted, for example, if the request timer expires or if the request is cancelled. If either of those events occur, a method within the request object is called, depending on the state of the request. If the request is currently processing, the abort method in the service provider's request object is called. If the request is queued, then the abortQueued method is called. Both the abort and abortQueued methods are called with a parameter that indicates the reason for the interruption. Its values can be either WFS_ER- R_TIMEOUT or WFS_ERROR CANCELED. Both abort methods give the service provider the opportunity to properly clean up the request.

If not overridden, the service provider framework sends request complete messages for both the abort and abort-Queued methods. That is all the processing the service provider framework performs for these operations. It is the responsibility of the service provider to implement either of these methods if the request complete messages sent by the service provider framework are undesirable.

The service provider framework for an embodiment of the present invention uses, for example, four threads per service provider to manage WFP requests for a particular service provider. The thread in which the XFS Manager uses to invoke the WFP entry point is not included in that number. The threads include, for example, a deferred processing queue (DPQ) manager thread and a deferred processing thread.

As previously mentioned, in an embodiment of the present invention, WFP requests are placed on a deferred processing queue to ensure proper serialization of WFP requests. At initialization, the DPQ manager thread is created and is initially blocked. In other word, it is in a nonsignaled state awaiting a request object to be queued. When signaled, the DPQ manager thread pops a request object from the deferred processing queue and creates another thread called the deferred processing thread in which the actual deferred processing for that WFP request is performed. The DPQ manager thread is again blocked while it awaits the termination of the deferred processing thread. When unblocked, the DPQ manager thread loops back and processes all request objects that may have been queued. If none are queued, then the DPQ manager thread blocks awaiting the next WFP request.

The main processing for most WFP requests is performed in its deferred processing. As already mentioned, a deferred processing thread is created each time a request object is popped from the deferred processing queue. Since a request object is not popped from the DPQ until the thread from the previous request object has terminated, there can be only one deferred processing thread active at any given time. The service provider may create other threads during a request object's deferred processing. If so, then the service provider is responsible for managing that thread and determining when it should be terminated.

Turning now to a description, of how the service provider accesses the request parameters for each WFP request, if any, and the processing responsibilities of both the service provider, if any, and the service provider framework, WFP requests include, for example, WFPCancelAsyncRequest, WFPClose, WFPDeregister, WFPExecute, WFPGetInfo, WPFLock, WFPOpen, WFPRegister, WFPSetTraceLevel, WFPUnloadService, and WFPUnlock.

In an embodiment of the present invention, the WFPCancelAsyncRequest specifies to the service provider framework which request(s) to cancel. The request can be, for example, in either a queued state or a currently processing state. In both cases, the abort method in the request object is called by the service provider framework to allow the service provider to post the request complete notification. If the service provider has not implemented an abort method for that request, the service provider framework posts the request complete notification. The parameters to the WFPCancelAsyncRequest request are stored within the Cancel Request object. Those stored in the SpiRequest objects are private and can only be accessed using an accessing function. FIG. 4 is a table that shows an example of each WFPCancelAsyncRequest parameter and how it is accessed for an embodiment of the present invention.

With regard to the WFPClose request, the service provider framework maintains a table of active sessions for every service provider. Upon receiving a valid close request, the service provider framework removes the particular session from the table and de-registers all events associated with that session. The service provider may use the getNumberOfSessions( ) method within the Close Request object to obtain the number of sessions for the particular service provider. If the number is zero, the service provider is responsible for de-activating and unloading the PDH associated with that service provider.

The parameters to the WFPClose request are stored within the Close Request object. Those stored in the SpiRequest and SpiAsyncRequest objects are private and can only be accessed using a function. FIG. 5 is a table of each WFPClose parameter and how it is accessed. The method for immediate processing is:

HRESULT <specificProvider>CloseRequest::spImmediateProcessing(void).

The service provider framework verifies each of the WFPClose parameters. The service provider may find it unnecessary to implement this method. The method for deferred processing is:

Boolean <specificProvider>CloseRequest:: spDeferredProcessing(void).

If the number of active sessions is zero, then spDeferredProcessing should de-activate and unload the PDH dynamic link library (dll) associated with the particular service provider.

The getNumberOfSessions method returns the number of currently active sessions. The method is:

int CloseRequest::getNumberOfSessions(serviceProvider)

XfsServiceProvider * serviceProvider.

The parameters include serviceProvider which is a handle unique to each XFS service provider. This handle is provided to each service provider in the serviceProvider attribute in every Open Request object. For the return value, if serviceProvider is valid, the number of active sessions is returned. Otherwise −1 is returned.

The number of active sessions reflects the session referred to in the current close request object. Thus, if a service provider receives a WFPOpen and subsequently a WFPClose request, getNumberOfSessions will return zero if called from the spDeferredProcessing method within the close request. This assumes that the WFPOpen and WFPClose refer to the same session and that no other WFPOpens have been received for other sessions.

The service provider framework handles all processing associated with the WFPDeregister request. The parameters to the WFPDeregister request are stored within the Deregister Request object. Those stored in the SpiRequest and SpiAsyncRequest objects are private and can only be accessed using a function. FIG. 6 is a table which illustrates examples of each WFPDeregister parameter and how it is accessed for an embodiment of the present invention.

The parameters to the WFPExecute request are stored within the Execute Request object. Those stored in the SpiRequest and SpiAsyncRequest objects are private and can only be accessed using a function. FIG. 7 is a table which illustrates an example of each WFPExecute parameter and how it is accessed for an embodiment of the present invention.

For immediate processing, the method is:

HRESULT <specificSp>ExecuteRequest:: spImmediateProcessing(void).

This method, if implemented, gives the service provider the opportunity to perform parameter verification before the Execute Request object is queued by the framework. The service provider framework verifies all parameters except dwCommand and lpCommandData. If any of those are invalid, this method is not invoked and the appropriate error code is returned to the application. The service provider should verify that dwCommand is valid and supported. If not, WFS_ERR_INVALID_COMMAND or WFS_ERR_UNSUPP_COMMAND should be returned as appropriate. Because WFS_INVALID_DATA can only be returned in the Execute Complete event (not as an immediate error), the actual data pointed to by lpCommandData cannot be verified in this method. However the service provider should verify that lpCommandData and any other pointers that it may contain are valid. If any are invalid, this method should return WFS_INVALID POINTER. If the service provider returns WFS_SUCCESS, the request object is queued on the deferred processing queue for later processing.

For deferred processing, the method is:

Boolean <specificSp>ExecuteRequest:: spDeferredProcessing(void).

This method, if implemented, is the entry point at which all WFPExecute commands for this service provider are processed. The WFPExecute parameters are accessed the same way as in the spImmediateProcessing method described above. Within this method the data contained in lpCommandData is verified. The service provider is responsible for using XfsEvent::postEvent( ) for all events associated with the WFPExecute request. This includes the Execute Complete event.

For abort processing, the method is:

void <specificSp>ExecuteRequest::abort(HRESULT abortReason, int requestStatus).

This method, if implemented, can be invoked either because the request was canceled by WFSCancel (abortReason=WFS_ERR_CANCELED) or because the request timed out (abortReason=WFS_ERR_TIMEOUT). In either case, the service provider is responsible for terminating any threads that may have been created in the spDeferredProcessing method (see above) and posting the Execute Complete event.

The service provider framework processes the WFPGetInfo request differently from all other WFP requests. Specifically, the WFPGetInfo is placed in a separate deferred processing queue, which means the deferred processing for this request can never be blocked by some other non-WFPGetInfo request.

The parameters to the WFPGetInfo request are stored within the GetInfo Request object. Those stored in the SpiRequest and SpiAsyncRequest objects are private and can only be accessed using a function. FIG. 8 is a table of each WFPGetInfo parameter and how it is accessed for an embodiment of the present invention.

For immediate processing, the method is:

HRESULT <specificSp>GetInfoRequest:: spImmediateProcessing(void)

This method, if implemented, gives the service provider the opportunity to perform parameter verification before the GetInfo Request object is queued by the framework. The service provider framework verifies all parameters except dwCategory and lpQueryDetails. If any of those are invalid, this method is not invoked and the appropriate error code is returned to the application. The service provider should verify that dwCategory is valid and supported. If not, WFS_ERR_INVALID_CATEGORY or WFS_ERR_UNSUPP_CATEGORY should be returned as appropriate. Because WFS_INVALID_DATA can only be returned in the GetInfo Complete event (not as an immediate error), the actual data pointed to by lpQueryDetails cannot be verified in this method. However the service provider should verify that lpQueryDetails and any other pointers that it may contain are valid. If any are invalid, this method should return WFS_INVALID_POINTER. If the service provider returns WFS_SUCCESS, the request object is queued on the deferred processing queue for later processing.

For deferred processing, the method is:

Boolean <specificSp>GetInfoRequest:: spDeferredProcessing(void)

This method, if implemented, is the entry point at which all WFPGetInfo commands for this service provider are processed. The WFPGetInfo parameters are accessed the same way as in the spImmediateProcessing method described above. Within this method, the data contained in lpQueryDetails is verified. The service provider is responsible for using XfsEvent::postEvent( ) for all events associated with the WFPGetInfo request. This includes the GetInfo Complete event.

For abort processing, the method is:

void <specificSp>GetInfoRequest::abort(HRESULT abortReason, int requestStatus).

This method, if implemented, can be invoked for either because the request was canceled by WFSCancel (abortReason=WFS_ERR_CANCELED) or because the request timed out (abortReason=WFS_ERR_TIMEOUT). In either case, the service provider is responsible for proper cleanup of any processing that may have been performed in regards to this request.

The parameters to the WFPOpen request are stored within the Open Request. Those stored in the SpiRequest and SpiAsyncRequest objects are private and can only be accessed using a function. FIG. 9 is a table which illustrates an example of each WFPOpen parameter and how it is accessed for an embodiment of the present invention.

For immediate processing, the method is:

HRESULT <specificSp>OpenRequest:: spImmediateProcessing(void).

This method, if implemented, is invoked by the service provider framework after all WFPOpen request parameters have been verified. This includes version negotiation as described in the WOSA XFS API/SPI Programmer's Reference Revision 2.00 section 5.7. Service providers may not need to implement this method.

For deferred processing, the method is:

Boolean <specificSp>OpenRequest:: spDeferredProcessing (void).

This method allows the service provider to perform the actual processing associated with "opening a device". This may include performing PDH commands to initialize the device used by this service provider. This method is invoked every time WFPOpen is called by the XFS Manager. The service provider must use the OpenRequest::openFailed( ) method if for some reason it determines that the open operation has failed. The openFailed( ) method allows the service provider framework to remove the session from its tables.

The parameters to the WFPRegister request are stored within the Register Request object. Those stored in the SpiRequest and SpiAsyncRequest objects are private and can only be accessed using a function. FIG. 10 is a table which illustrates an example of each WFPRegister parameter and how it is accessed for an embodiment of the present invention.

The parameters to the WFPSetTraceLevel request are stored within the Set Trace Level Request object. Those stored in the SpiRequest object are private and can only be accessed using a function. FIG. 11 is a table which illustrates an example of each WFPSetTraceLevel parameter and how it is accessed for an embodiment of the present invention.

Event processing is described in Section 3.11 in the WOSA XFS API/SPI Programmer's Reference Revision 2.00. The postEvent( ) method in the XfsEvent object is used to post event messages for WFP request complete and for the EXECUTE, SERVICE, USER, and SYSTEM events. XfsPost( ) is described hereinafter.

WFP request complete events or completion events for short, are Windows messages that are used to indicate that a given asynchronous WFP request is through processing. The service provider is responsible for posting completion events for any WFP request in which the service provider has implemented a spDeferredProcessing method that overrides the same method in the base class for that WFP request. Typically the service provider implements a spDeferredProcessing method for WFPOpen, WFPExecute, WFPGetInfo, and WFPClose requests. The service provider framework posts all other completion events.

Each service provider is responsible for posting all Execute, Service, and User events described in the Programmer's Reference for their device. The service provider is also responsible for posting the System events described in the Device Status Changes section and the Hardware and Software Errors section of the Programmer's Reference. The service provider framework is responsible for posting the system events related to undeliverable messages and version negotiation errors.

For postEvent( ), the method is:

void XfsEvent::postEvent(

DWORD notificationMessage,

XfsServiceProvider *serviceProvider,

LPWFSRESULT lpWfsResult)

This method is used by service providers to send events and request completion notifications.

Parameters include notificationMessage which can take on the following values:

WFS_SERVICE_EVENT

WFS_USER_EVENT

WFS_SYSTEM_EVENT

WFS_EXECUTE_EVENT

Command Completion Messages (see WOSA XFS API/SPI Programmer's

Reference Revision 2.00 section 9.1.1)

Parameters also include:

serviceProvider is a handle unique to each XFS service provider. This handle is provided to each service provider in the serviceProvider attribute in every Open Request object.

hResult is the value placed in the hResult member of the WFSRESULT structure pointed to by lpWfsResult lpWfsResult is a pointer to a WFSRESULT structure. The service provider framework allocates a WFSRESULT structure anytime a request object is instantiated. The attribute name inside the request object is wfsResult. So, if the event to be posted is a Request Complete event, the WFSRESULT structure from the request object can be used; but only once. Any subsequent event postings for that request must use the XfsEvent::allocateWfsResult( ) to allocate a new WFSRESULT structure. If for any event, the WFSRESULT structure points to additional data, XfsEvent::allocateMore( ) (see below) must be used to allocate additional space.

For the SERVICE_EVENTS, USER_EVENTS, and SYSTEM_EVENTS, postEvent sends event notification to every hWnd for this service that has registered for the specified event. For EXECUTE_EVENTS, only the hWnd associated with the hService for the execute request currently in progress receives the event notification. The service provider is responsible for setting the hResult and dwEventID member of the WFSRESULT structure. The RequestID, hService, and tsTimestamp members of the WFSRESULT structure are set by the postEvent method.

For allocateWfsResult, the method is:

HRESULT XfsEvent::allocateWfsResult(LPVOID * lppvData).

This method is used to allocate an XFS WFSRESULT structure.

Parameters include:

lppvData which is the address of the variable in which allocatWfsResult will place the pointer to the allocated memory. If the function return is not WFS_SUCCESS, the return value is one of the following error conditions:

WFS_ERR_INVALID_POINTER if lppvData does not point to accessible memory.

WFS_ERR_OUT_OF_MEMORY if there is not enough memory available to satisfy to request. When calling WFMallocateBuffer, the service provider framework uses both the WFS_MEM_SHARE and WFS_MEM_ZEROINIT flags.

For allocateMore, the method is:

HRESULT XfxEvent::allocateMore(

ULONG ulSize

LPVOID lpvoriginal

LPVOID * lppvData)

This method is used to allocate a memory buffer, linking it to an existing one. Parameters include:

ulSize which is the size (in bytes) of the memory to be allocated.

lpvOriginal which is the address of the original buffer to which the newly allocated buffer should be linked.

lppvData which is the address of the variable in which allocatWfsResult will place the pointer to the allocated memory.

If the function return is not WFS_SUCCESS, the return value is one of the following error conditions:

WFS_ERR_INVALID_POINTER if a pointer parameter does not point to accessible memory.

WFS_ERR_OUT_OF_MEMORY if there is not enough memory available to satisfy to request.

WFS_ERR_INVALID_ADDRESS the lpvOriginal parameter does not point to a previously allocated buffer.

When calling WFMallocateBuffer, the service provider framework uses both the WFS_MEM_SHARE and WFS_MEM_ZEROINIT flags.

As already mentioned, in an embodiment of the present invention, each service provider is required to instantiate a specific instance of its service provider object. That object is derived from the service provider framework's XFS Service Provider class as shown in FIG. 2. The XFS Service Provider class has virtual methods, such as forExecuteRequest, that will instantiate the request objects if not overridden by the same function in the service provider's derived class. So, for those WFP requests, such as WFPExecute, that require service provider processing, the service provider must override the request object instantiation method in the XFS Service Provider base class. Using the depositor service provider as an example, the method in the derived service provider class is, for example:

DepositorExecuteRequest *

DepositorServiceProvider::forExecuteRequest(void)
{
    DepositorExecuteRequest * request;
    request=new DepositorExecuteRequest;
    return(request);

1. result buffer how do applications access.

2. cancel/abort should be the service providers responsibility to terminate the thread in a timely fashion.

Various preferred embodiments of the invention have been described in fulfillment of the various objects of the invention. It should be recognized that these embodiments are merely illustrative of the principles of the invention.

Numerous modifications and adaptations thereof will be readily apparent to those skilled in the art without departing from the spirit and scope of the present invention.

What is claimed is:

1. A method for obtaining at least one device service on a self-service transaction terminal using a service provider framework, comprising:
    receiving data by a self-service transaction terminal application indicative of a need for obtaining a transaction terminal device service;
    issuing a request by the transaction terminal application to an Extensions for Financial Services Protocol ("XFS") manager to get the transaction terminal device service;
    translating the request by the XFS manager for processing by a service provider;
    obtaining the transaction terminal device service by the service provider;
    wherein obtaining the transaction terminal device service by the service provider further comprises processing the request in at least one of an immediate processing part and a deferred processing part; and
    wherein processing the request in the deferred processing part further comprises placing a request object on a deferred processing queue.

2. The method of claim 1, wherein receiving the data by the transaction terminal application further comprises receiving the data indicative of the need for obtaining the transaction terminal device service in connection with a device selected from a group of transaction terminal devices consisting of a depository, a printer, a card reader, a safe door, a cash dispenser, and a touchscreen.

3. The method of claim 1, wherein issuing the request to the XFS manager further comprises making a sub-routine call by the transaction terminal application to the XFS manager to get the transaction terminal device service from a service provider.

4. The method of claim 1, wherein translating the request for processing by the service provider further comprises translating a sub-routine call by the XFS manager as an entry point into the service provider for processing by the service provider.

5. The method of claim 4, wherein translating the sub-routine call as an entry point into the service provider further comprises instantiating a request object associated with the request.

6. The method of claim 1, wherein translating the request for processing by the service provider further comprises implementing the service provider.

7. The method of claim 6, wherein implementing the service provider further comprises instantiating an instance of a service provider framework XFS service provider base class and at least one instance of a service provider framework request object required to process the request.

8. The method of claim 7, wherein instantiating the instance of the service provider framework XFS service provider base class and service provider framework request object further comprises instantiating a specific instance of the service provider's service provider request object derived from an XFS service provider base class service provider request object class hierarchy.

9. The method of claim 7, wherein instantiating the instance of the service provider framework XFS service provider base class and service provider framework request object further comprises instantiating the instance of the service provider framework XFS service provider base class and at least one instance of the service provider framework request object defined for a request class selected from a plurality of request classes derived from one another.

10. The method of claim 7, wherein instantiating the instance of the service provider framework XFS service provider base class and framework request object further comprises instantiating the instance of the service provider framework XFS service provider base class and at least one instance of the framework request object defined for a request class selected from a group of request classes consisting of a SpiRequest class, a SpiAsyncRequest class, a request specific class, and a service provider specific request class.

11. The method of claim 1, wherein obtaining the transaction terminal device service by the service provider further comprises invoking at least one virtual method within a derived object of the service provider by the service provider framework through class inheritance to allow the service provider to perform processing unique to the transaction terminal device service.

12. The method of claim 1, wherein processing the request in the immediate processing part further comprises performing immediate processing in a thread used by the XFS manager when invoking an entry point of the service provider.

13. The method of claim 1, wherein processing the request in the immediate processing part further comprises performing parameter verification by a service provider framework in an immediate processing method of the service provider framework.

14. The method of claim 1, wherein processing the request in the immediate processing part further comprises invoking a spImmediateProcessing( ) method within the service provider's derived class by the service provider framework.

15. The method of claim 14, wherein invoking the spImmediateProcessing( ) method within the service provider's derived class further comprises returning a return code from spImmediateProcessing( ) to the XFS manager.

16. The method of claim 1, wherein processing the request in the immediate processing part further comprises determining a code by a service provider framework for return to the XFS manager.

17. The method of claim 1, wherein processing the request in the immediate processing part further comprises processing at least one of a WFPCancelAsyncRequest request, a WFPSetTraceLevel request, and a WFPUnload request as a process immediate request by a service provider framework.

18. The method of claim 1, wherein processing the request in the deferred processing part further comprises popping the request object from the deferred processing queue by a deferred processing queue manager thread.

19. The method of claim 18, wherein processing the request in the deferred processing part further comprises processing the request in a deferred processing thread created by the deferred processing queue manager.

20. The method of claim 1, wherein processing the request in the deferred processing part further comprises performing deferred processing for the request that is common to all service providers by a service provider framework.

21. The method of claim 1, wherein processing the request in the deferred processing part further comprises invoking a spDeferredProcessing( ) method within a derived class of the service provider by a service provider framework.

22. The method of claim 21, wherein processing the request in the deferred processing part further comprises performing all processing necessary to satisfy the request within the spDeferredProcessing method by the service provider.

23. The method of claim 22, wherein processing the request in the deferred processing part further comprises posting a request complete event by the service provider.

24. The method of claim 23, wherein processing the request in the deferred processing part further comprises terminating a thread and deleting a request object.

25. The method of claim 1, wherein processing the request in the deferred processing part further comprises posting a request complete event by a service provider framework.

26. The method of claim 1, wherein obtaining the device service by the service provider further comprises accessing at least one request parameter by the service provider.

27. The method of claim 26, wherein accessing the request parameter by the service provider further comprises accessing the parameter for a request selected from a group of requests consisting of a WFPCancelAsyncRequest request, a WFPClose request, a WFPDeregister request, a WFPExecute request, a WFPGetInfo request, a WPFLock request, a WFPOpen request, a WFPRegister request, a WFPSetTraceLevel request, a WFPUnloadService request, and a WFPUnlock request.

28. The method of claim 27, wherein accessing the request parameter for the WFPCancelAsyncRequest request by the service provider further comprises accessing at least one of an hService parameter and a reqID parameter.

29. The method of claim 27, wherein accessing the request parameter for the WFPClose request by the service provider further comprises accessing at least one of an hService parameter, an hWnd parameter, and a reqID parameter.

30. The method of claim 27, wherein accessing the request parameter for the WFPDeregister request by the service provider further comprises accessing at least one of an hService parameter, a dwEventClass parameter, an hWndReg parameter, an hWnd parameter, and a reqID parameter.

31. The method of claim 27, wherein accessing the request parameter for the WFPExecute request by the service provider further comprises accessing at least one of an hService parameter, a dwCommandData parameter, an IpCommandData parameter, a dwTimeOut parameter, an hWnd parameter, and a reqID parameter.

32. The method of claim 27, wherein accessing the request parameter for the WFPGetInfo request by the service provider further comprises accessing at least one of an hService parameter, a dwCagegory parameter, an IPQueryDetails parameter, a dwTimeOut parameter, an hWnd parameter, and a reqID parameter.

33. The method of claim 27, wherein accessing the request parameter for the WFPOpen request by the service provider further comprises accessing at least one of an hService parameter, an IpszLogicalName parameter, an hApp parameter, an IpszApplicationID parameter, a dwTraceLevel parameter, a dwTimeOut parameter, an hWnd parameter, a reqID parameter, an hPprovider parameter, a dwSPVersionsRequired parameter, an IpSPIVersion parameter, a dwSrvcVersionsRequired parameter, and an IpSrvcVersion parameter.

34. The method of claim 27, wherein accessing the request parameter for the WFPRegister request by the service provider further comprises accessing at least one of an hService parameter, a dwEventClass parameter, an hWndReg parameter, an hWnd parameter, and a reqID parameter.

35. The method of claim 27, wherein accessing the request parameter for the WFPSetTraceLevel request by the service provider further comprises accessing at least one of an hService parameter and a dwTraceLevel parameter.

36. A system for obtaining at least one device service on a self-service transaction terminal using a service provider framework, comprising:
 means for receiving data by a self-service transaction terminal application indicative of a need for obtaining a transaction terminal device service;
 means for issuing a request by the transaction terminal application to an Extensions for Financial Services Protocol ("XFS") manager to get the transaction terminal device service;
 means for translating the request by the XFS manager for processing by a service provider;
 means for obtaining the transaction terminal device service by the service provider;
 wherein the means for obtaining the transaction terminal device service by the service provider further comprises means for processing the request in at least one of an immediate processing part and a deferred processing part; and
 wherein the means for processing the request in the deferred processing part further comprises means for placing a request object on a deferred processing queue.

37. The system of claim 36, wherein the means for receiving the data by the transaction terminal application further comprises means for receiving the data indicative of the need for obtaining the transaction terminal device service in connection with a device selected from a group of transaction terminal devices consisting of a depository, a printer, a card reader, a safe door, a cash dispenser, and a touchscreen.

38. The system of claim 36, wherein the means for issuing the request to the XFS manager further comprises means for making a sub-routine call by the transaction terminal application to the XFS manager to get the transaction terminal device service from a service provider.

39. The system of claim 36, wherein the means for translating the request for processing by the service provider further comprises means for translating a sub-routine call by the XFS manager as an entry point into the service provider for processing by the service provider.

40. The system of claim 39, wherein the means for translating the sub-routine call as an entry point into the service provider further comprises means for instantiating a request object associated with the request.

41. The system of claim 36, wherein the means for translating the request for processing by the service provider further comprises means for implementing the service provider.

42. The system of claim 41, wherein the means for implementing the service provider further comprises means for instantiating an instance of a service provider framework XFS service provider base class and at least one instance of a service provider framework request object required to process the request.

43. The system of claim 42, wherein the means for instantiating the instance of the service provider framework XFS service provider base class and service provider framework request object further comprises means for instantiating a specific instance of the service provider's service provider request object derived from an XFS service provider base class service provider request object class hierarchy.

44. The system of claim 42, wherein the means for instantiating the instance of the service provider framework XFS service provider base class and service provider framework request object further comprises means for instantiating the instance of the service provider framework XFS service provider base class and at least one instance of the service provider framework request object defined for a request class selected from a plurality of request classes derived from one another.

45. The system of claim 42, wherein the means for instantiating the instance of the service provider framework XFS service provider base class and framework request object further comprises means for instantiating the instance of the service provider framework XFS service provider base class and at least one instance of the framework request object defined for a request class selected from a group of request classes consisting of a SpiRequest class, a SpiAsyncRequest class, a request specific class, and a service provider specific request class.

46. The system of claim 36, wherein the means for obtaining the transaction terminal device service by the service provider further comprises means for invoking virtual methods within derived objects of the service provider by the service provider framework through class inheritance to allow the service provider to perform processing unique to the transaction terminal device service.

47. The system of claim 36, wherein the means for processing the request in the immediate processing part further comprises means for performing immediate processing in a thread used by the XFS manager when invoking an entry point of the service provider.

48. The system of claim 36, wherein the means for processing the request in the immediate processing part further comprises means for performing parameter verification by a service provider framework.

49. The system of claim 36, wherein the means for processing the request in the immediate processing part further comprises means for invoking a spImmediateProcessing( ) method within the service provider's derived class by the service provider framework.

50. The system of claim 49, wherein the means for invoking the spImmediateProcessing( ) method within the service provider's derived class further comprises means for returning a return code from spImmediateProcessing( ) to the XFS manager.

51. The system of claim 36, wherein the means for processing the request in the immediate processing part further comprises means for determining a code by a service provider framework for return to the XFS manager.

52. The system of claim 36, wherein the means for processing the request in the immediate processing part further comprises means for processing at least one of a WFPCancelAsyncRequest request, a WFPSetTraceLevel request, and a WFPUnload request as a process immediate request by a service provider framework.

53. The system of claim 36, wherein the means for processing the request in the deferred processing part further comprises means for popping a request object from a deferred processing queue by a deferred processing queue manager thread.

54. The system of claim 53, wherein the means for processing the request in the deferred processing part further comprises means for processing the request in a deferred processing thread created by the deferred processing queue manager.

55. The system of claim 36, wherein the means for processing the request in the deferred processing part further comprises means for performing deferred processing for the request that is common to all service providers by a service provider framework.

56. The system of claim 36, wherein the means for processing the request in the deferred processing part further comprises means for invoking a spDeferredProcessing( ) method within a derived class of the service provider by the service provider framework.

57. The system of claim 56, wherein the means for processing the request in the deferred processing part further comprises means for performing all processing necessary to satisfy the request within the spDeferredProcessing method by the service provider.

58. The system of claim 57, wherein the means for processing the request in the deferred processing part further comprises means for posting a request complete event by the service provider.

59. The system of claim 58, wherein the means for processing the request in the deferred processing part further comprises means for terminating a thread and deleting a request object.

60. The system of claim 36, wherein the means for processing the request in the deferred processing part further comprises means for posting a request complete event by a service provider framework.

61. The system of claim 36, wherein the means for obtaining the device service by the service provider further comprises means for accessing at least one request parameter by the service provider.

62. The system of claim 61, wherein the means for accessing the request parameter by the service provider further comprises means for accessing the parameter for a request selected from a group of requests consisting of a WFPCancelAsyncRequest request, a WFPClose request, a WFPDeregister request, a WFPExecute request, a WFPGetInfo request, a WPFLock request, a WFPOpen request, a WFPRegister request, a WFPSetTraceLevel request, a WFPUnloadService request, and a WFPUnlock request.

63. The system of claim 62, wherein the means for accessing the request parameter for the WFPCancelAsyncRequest request by the service provider further comprises means for accessing at least one of an hService parameter and a reqID parameter.

64. The system of claim 62, wherein the means for accessing the request parameter for the WFPClose request by the service provider further comprises means for accessing at least one of an hService parameter, an hWnd parameter, and a reqID parameter.

65. The system of claim 62, wherein the means for accessing the request parameter for the WFPDeregister request by the service provider further comprises means for accessing at least one of an hService parameter, a dwEventClass parameter, an hWndReg parameter, an hWnd parameter, and a reqID parameter.

66. The system of claim 62, wherein the means for accessing the request parameter for the WFPExecute request by the service provider further comprises means for accessing at least one of an hService parameter, a dwCommandData parameter, an IpCommandData parameter, a dwTimeOut parameter, an hWnd parameter, and a reqID parameter.

67. The system of claim 62, wherein the means for accessing the request parameter for the WFPGetInfo request by the service provider further comprises means for accessing at least one of an hService parameter, a dwCagegory parameter, an IPQueryDetails parameter, a dwTimeOut parameter, an hWnd parameter, and a reqID parameter.

68. The system of claim 62, wherein the means for accessing the request parameter for the WFPOpen request by the service provider further comprises means for accessing at least one of an hService parameter, an IpszLogicalName parameter, an hApp parameter, an IpszApplicationID parameter, a dwTraceLevel parameter, a dwTimeOut parameter, an hWnd parameter, a reqID parameter, an hPprovider parameter, a dwSPVersionsRequired parameter, an IpSPIVersion parameter, a dwSrvcVersionsRequired parameter, and an IpSrvcVersion parameter.

69. The system of claim 62, wherein the means for accessing the request parameter for the WFPRegister request by the service provider further comprises means for accessing at least one of an hService parameter, a dwEventClass parameter, an hWndReg parameter, an hWnd parameter, and a reqID parameter.

70. The system of claim 62, wherein the means for accessing the request parameter for the WFPSetTraceLevel request by the service provider further comprises means for accessing at least one of an hService parameter and a dwTraceLevel parameter.

71. A method for obtaining at least one device service on a self-service transaction terminal using a service provider framework, comprising:

receiving data by the self-service transaction terminal application indicative of a need for the performance of a transaction terminal device function selected from a group of device functions consisting of a depository function, a printer function, a card reader function, a safe door function, a cash dispenser function, and a touch-screen function;

making a sub-routine call by the transaction terminal application to a lower level layer of central transaction terminal monitoring and management application software to request device service from a service provider;

translating the sub-routine call at the lower level layer into a function category request by an Extensions for Financial Services Protocol ("XFS") manager as an entry point into the service provider for processing by the service provider, the function request being selected from a group of function requests consisting of a WFPCancelAsyncRequest request, a WFPClose request, a WFPDeregister request, a WFPExecute request, a WFPGetInfo request, a WPFLock request, a WFPOpen request, a WFPRegister request, a WFPSetTraceLevel request, a WFPUnloadService request, and a WFPUnlock request; and returning a result of the function category request to the application by the service provider.

* * * * *